Jan. 3, 1950 W. S. KEYSER 2,493,408
HYDRAULIC DRIVE
Filed July 5, 1946 2 Sheets-Sheet 1

INVENTOR.
Wilbur S. Keyser
BY
Mason & Graham
Attys.

Jan. 3, 1950 W. S. KEYSER 2,493,408
HYDRAULIC DRIVE
Filed July 5, 1946 2 Sheets-Sheet 2

INVENTOR.
Wilbur S. Keyser
BY
Mason & Graham
Attys

Patented Jan. 3, 1950

2,493,408

UNITED STATES PATENT OFFICE 2,493,408

HYDRAULIC DRIVE

Wilbur S. Keyser, Hollywood, Calif.

Application July 5, 1946, Serial No. 681,507

5 Claims. (Cl. 74—688)

My invention relates to a torque transmission device of the type in which a fluid impeller is driven by an engine, the fluid thrown out from the impeller striking a spinner or follower mounted coaxially with but on a separate shaft from the impeller and imparting a torque to the shaft on which the follower or spinner is mounted, both impeller and follower being mounted in a fluid tight housing containing a quantity of liquid.

Various embodiments of fluid drives of the type described are in use or have been proposed but all such fluid drives, to the best of my knowledge suffer, to varying degrees, from inducing sufficient drag on the driven unit when the engine is idling to cause the driven shaft to rotate and, in the case of a vehicle fitted with such a fluid drive, cause it to "creep," or move forward slowly.

It is a general object of the invention to provide a fluid torque transmission unit which shall be free from the defect described.

It is also an object of the invention to provide a fluid drive unit in which the torque of the engine driven impeller is dissipated when the engine is idling so that no torque is transmitted to the shaft driven by the follower.

It is a further object of the invention to provide a balanced fluid drive structure in addition to having the novel characteristic above described.

Another object of the invention is to provide a fluid drive transmission in which the driven member is motionless during idling of the engine, which drive is simple and sturdy in construction.

Yet another object is to provide a fluid torque transmission unit which is effective to drive a driven member at speeds varying from higher speeds than that of the driving member to zero speed, depending on the speed of the driving member.

Further features and objects of the invention will hereinafter appear from the following description taken in conjunction with the accompanying illustrative drawings, in which.

Figure 1:
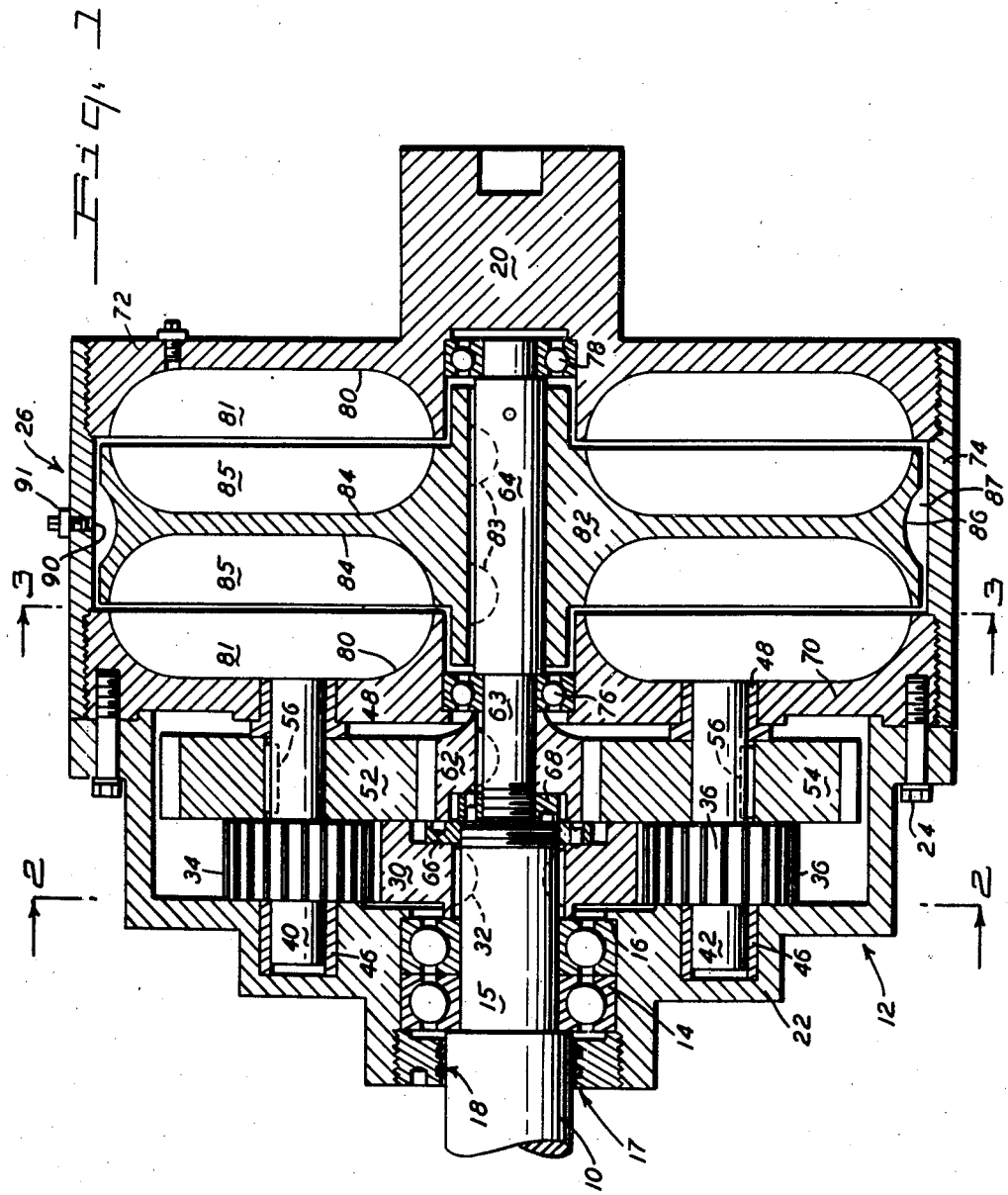
Fig. 1 is a central vertical section through the fluid drive of my invention.
Figure 2:
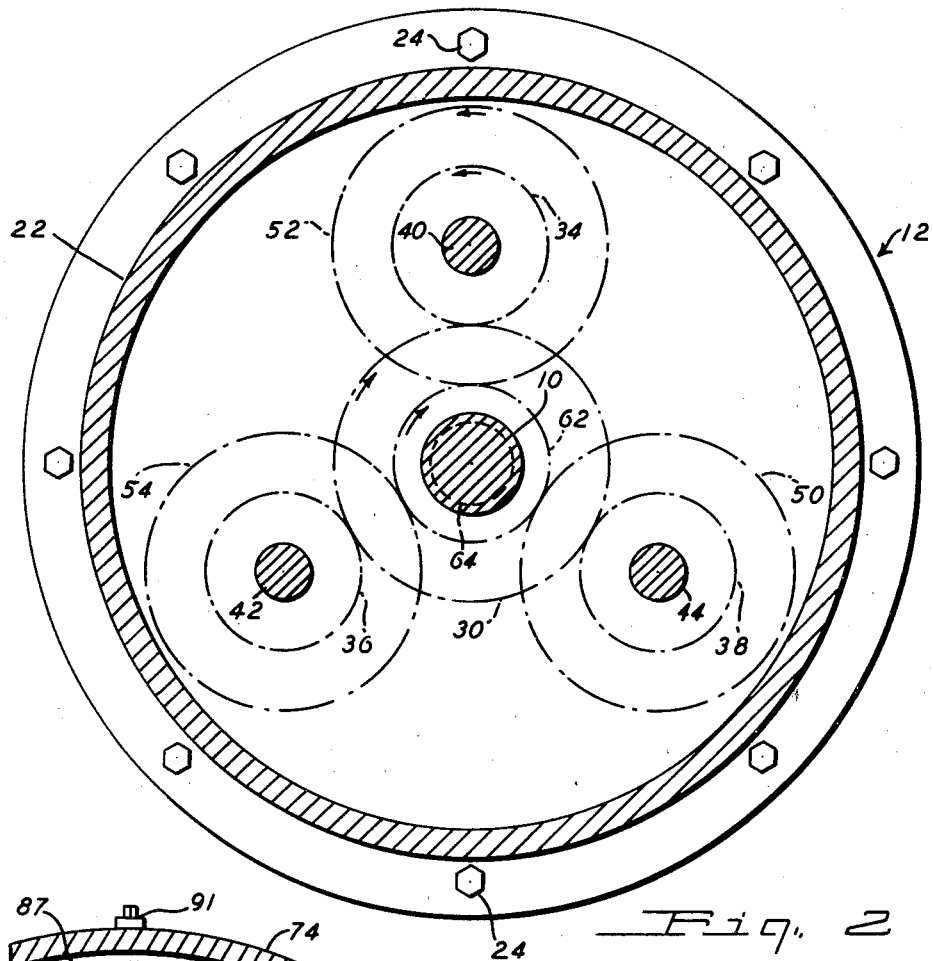
Fig. 2 is a cross section on line 2—2 of Fig. 1.

In the drawings, the numeral 10 indicates the end of the engine shaft projecting into a built-up housing 12 rotatable about the shaft 10, a double-row ball bearing 14 being arranged between the reduced end 15 of the engine shaft and the housing. The bearing 14 is positioned between shoulder 16 projecting inwardly from the housing and a locking ring 17 screwed into the engine end of the housing. A suitable packing means 18 may be provided for sealing the shaft and housing.

It will be understood that the engine shaft will be properly supported in bearings (not shown) while the opposite end of the housing 12 may be supported on a driven shaft (not shown) or a bearing may be provided at the hub end 20 of the housing.

The built-up housing comprises a gear case 22 rigidly secured by studs 24 to a fluid coupling housing 26 in which the fluid coupling elements, later described, are mounted. The aforementioned hub or stub shaft 20 projects from the rear wall of the housing and may be supported as previously mentioned.

Within the gear case 22 a driving gear or sun gear 30 is keyed by keys 32 to the engine shaft. Gear 30 meshes with three pinions 34, 36, 38 formed integral with shafts 40, 42, 44 mounted in bushings 46, fitted in the front wall of the gear case 22, and in bushings 48 fitted in the front wall of the fluid coupling housing 26.

Gears 50, 52, 54 are secured on shafts 40, 42, 44 respectively by keys 56, and the gears 50, 52, 54 engage with and drive a pinion 62 secured to the impeller shaft 64.

A locking ring 66 is provided to hold shaft 10 and gear 30 in position. Opposite this a locking ring 68 is provided mounted on the reduced end 63 of the impeller shaft 64 for holding pinion 62 in position.

In the gear system described, the engine driven gear 30 is of greater diameter than gears 34, 36 and 38, and gears 50, 52 and 54 are of greater diameter than gear 62 mounted on the impeller shaft so that the impeller is driven at a speed higher than that of the engine shaft. I have found that a ratio of three to one as shown in the drawings gives satisfactory results, though different ratios may be used provided the impeller is driven at a higher rate than the engine shaft.

The fluid coupling housing is shown as built up of a front wall or follower plate 70 and a rear wall or second follower plate 72 connected by a cylindrical shell 74 into which the end walls are screwed, as shown. The impeller shaft 64 is supported in a front ball bearing 76 mounted in the front wall 70 and a rear ball bearing 78 mounted in the rear wall 72.

Figure 3:
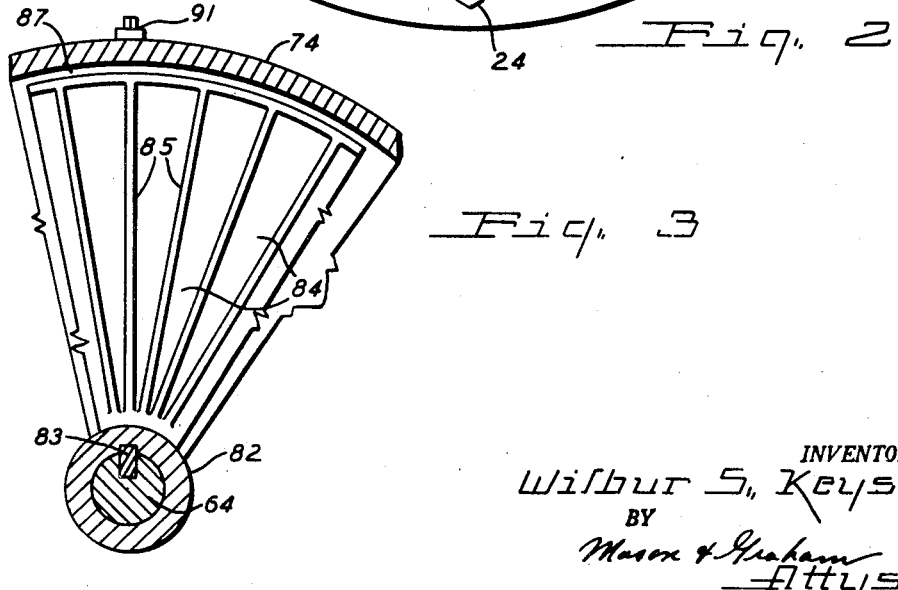
Fig. 3 is a cross section on line 3—3 of Fig. 1.

The inwardly facing sides of front and rear walls 70 and 72 are formed, for instance by casting, with symmetrically arranged radially extending recessed portions 80 divided by vanes 81. The engine driven disc-like impeller 82 is secured on shaft 64 by keys 83 and is provided on each side with recesses 84 and vanes 85 arranged to correspond to the recesses and vanes in the end walls, as shown in Fig. 3.

The impeller is provided with a peripheral recess 86 to reduce resistance to the passage of fluid between the fluid chambers on opposite faces of the impeller formed by the periphery of the impeller 82 and the inner surface of the shell 74.

Hydraulic fluid may be introduced into the housing 26 through a threaded bore 90 closed by a filler plug 91 to a level such that at idling speed of the engine the impeller will cause surging of the hydraulic fluid between the recesses in the impeller and in the end plates and through the clearance space between the raised ribs or vanes 85 on the impeller and the corresponding ribs or vanes 81 on the end plates 70 and 72, and also through the passage 87 between the edge of the impeller and the housing without causing rotation of the housing 26 and the normal load thereon, and therefore no torque is transmitted from the engine to the coupling stub shaft 20.

However, when the engine speed is increased the high speed of rotation of the impeller which, in the embodiment of the invention shown in the drawings, rotates at approximately three times the speed of rotation of the engine crankshaft, imparts sufficient energy to the fluid in the impeller housing to cause it to rotate the housing in the same direction as that of the crankshaft and transmit the torque of the engine shaft to the stub shaft 20 and thereby to any mechanism, such as the drive shaft of an automobile or truck, to which the stub shaft is coupled.

A fluid drive constructed and fitted in an automobile as above described has performed satisfactorily in service and has proved free from the drawbacks to which known types of fluid drive are subject. With the construction outlined, it is possible to space the impeller and the follower portions of the housing sufficiently to insure that a given a load will not be moved by the given normal idling speed of the prime mover such as an internal combustion engine and at the same time insure that the load will be driven by an increase in the speed of the prime mover.

Although a particular embodiment of the invention has been shown and described, it is contemplated that various changes and modifications can be made without departing from the scope of the invention as indicated by the claims.

I claim:

1. A torque transmission device including: a housing; a driveshaft rotatably mounted in an end wall of said housing and having its inner end projecting thereinto; a sun gear mounted on said inner end and revolvable therewith; planetary gears mounted in said housing and meshing with said sun gear; a second shaft mounted within said housing for rotation independently thereof and axially aligned with said driveshaft; an impeller mounted on said second shaft; a second sun gear on said second shaft; a follower affixed to said housing in hydraulic coupling relation to said impeller; second planetary gears mounted in said housing and rotatable with said first planetary gears and meshing with said second sun gear; and a driven shaft mounted on said housing and rotatable therewith.

2. A torque transmission device including: a housing; a driveshaft rotatably mounted in an end wall of said housing and having its inner end projecting thereinto; a sun gear mounted on said inner end and revolvable therewith; planetary gears mounted in said housing and meshing with said sun gear; a second shaft mounted within said housing for rotation independently thereof and axially aligned with said driveshaft; an impeller mounted on said second shaft, said impeller being double faced and having vanes on either side thereof; a second sun gear on said second shaft; a follower affixed to said housing in hydraulic coupling relation to said propeller, said follower comprising vaned members mounted on either side of said impeller; second planetary gears mounted in said housing and rotatable with said first planetary gears and meshing with said second sun gear; and a driven shaft mounted on said housing and rotatable therewith.

3. A torque transmission device including: a housing; a driveshaft rotatably mounted in an end wall of said housing and having its inner end projecting thereinto; a sun gear mounted on said inner end and revolvable therewith; planetary gears mounted in said housing and meshing with said sun gear; a second shaft mounted wholly within said housing for rotation independently thereof and axially aligned with said driveshaft; an impeller mounted on said second shaft; a second sun gear on said second shaft; a follower affixed to said housing in hydraulic coupling relation to said impeller; said second planetary gears mounted in said housing and rotatable with said first planetary gears and meshing with said second sun gear; and a driven shaft mounted on said housing and rotatable therewith.

4. A torque transmission device including: a housing: a driveshaft rotatably mounted in an end wall of said housing and having its inner end projecting thereinto; a sun gear mounted on said inner end and revolvable therewith; planetary gears mounted in said housing and meshing with said sun gear; a second shaft mounted wholly within said housing for rotation independently thereof; an impeller mounted on said second shaft, said impeller being double faced and having vanes on either side thereof; a second sun gear on said second shaft; a follower affixed to said housing in hydraulic coupling relation to said impeller; second planetary gears mounted in said housing and rotatable with said first planetary gears and meshing with said second sun gear; and a driven shaft mounted on said housing and rotatable therewith.

5. A torque transmission device including: a housing; a driveshaft rotatably mounted in an end wall of said housing and having its inner end projecting thereinto; a sun gear mounted on said inner end and revolvable therewith; planetary gears mounted in said housing and meshing with said sun gear; a second shaft mounted wholly within said housing for rotation independently thereof and axially aligned with said driveshaft; an impeller mounted on said second shaft, said impeller being double faced and having vanes on either side thereof; a second sun gear on said second shaft; a follower affixed to said housing in hydraulic coupling relation to said impeller, said follower comprising vaned members mounted on either side of said impeller; second planetary gears mounted in said housing and rotatable with said first planetary gears and meshing with said second sun gear; and a driven shaft mounted on said housing and rotatable therewith.

WILBUR S. KEYSER.

REFERENCES CITED

The following references are of record in the file of this patent:

UNITED STATES PATENTS

| Number | Name | Date |
| --- | --- | --- |
| 1,242,974 | Pinckney | Oct. 16, 1917 |
| 2,070,262 | Duffield | Feb. 9, 1937 |
| 2,102,131 | Schmid | Dec. 14, 1937 |
| 2,114,179 | Fottinger | Apr. 12, 1938 |
| 2,226,760 | Fottinger | Dec. 31, 1940 |
| 2,309,912 | Lazaga | Feb. 2, 1943 |
| 2,363,952 | Fillmore | Nov. 28, 1944 |
| 2,385,834 | Nallinger et al. | Oct. 2, 1945 |